United States Patent [19]

Goguen

[11] 4,371,003

[45] Feb. 1, 1983

[54] SWIMMING POOL/SPA SELECTOR VALVE

[76] Inventor: Robert P. Goguen, 350 Laurelwood Rd., Santa Clara, Calif. 95050

[21] Appl. No.: 226,071

[22] Filed: Jan. 19, 1981

[51] Int. Cl.³ .............................................. F16K 11/06
[52] U.S. Cl. .................................. 137/625.46; 4/489; 4/507
[58] Field of Search ...................... 137/625.46, 625.11, 137/625.21; 4/489, 507

[56] References Cited

U.S. PATENT DOCUMENTS

| | | | |
|---|---|---|---|
| 668,557 | 2/1901 | Englen | 251/288 |
| 1,726,086 | 8/1929 | Travis | 137/625.19 |
| 2,485,842 | 10/1949 | Pennington | 137/625.19 |
| 2,523,521 | 9/1950 | Ritter | 137/625.19 |
| 3,114,393 | 12/1963 | Vlasic | 137/625.18 |
| 3,217,749 | 11/1965 | Greenwald | 137/625.18 |
| 3,623,165 | 11/1971 | Whittell, Jr. | 4/489 |
| 3,640,310 | 2/1972 | Erlich | 137/625.46 |
| 3,773,078 | 11/1973 | Suntheimer | 137/625.11 |
| 3,834,537 | 9/1974 | Brett | 210/136 |
| 3,837,016 | 9/1974 | Schindler et al. | 4/489 |
| 3,874,413 | 4/1975 | Valdez | 137/625.47 |

FOREIGN PATENT DOCUMENTS 577807  6/1959  Canada ........................ 137/625.46

Primary Examiner—Arnold Rosenthal
Attorney, Agent, or Firm—Phillips, Moore, Lempio & Finley

[57] ABSTRACT

This disclosure describes a valve for concurrently shifting two independent flows of fluid. The valve includes a valve body having five ports sequentially disposed about a circle and one port disposed at the center of the circle. The valve also includes a selector member rotatable relative to the valve body between two operating positions. The selector member has a radial conduit and an arcuate conduit that selectively communicates with the ports. One application of this valve is for shifting a recirculating swimming pool pump, filter and heater between a swimming pool and a spa.

6 Claims, 5 Drawing Figures

U.S. Patent Feb. 1, 1983 Sheet 1 of 2 4,371,003
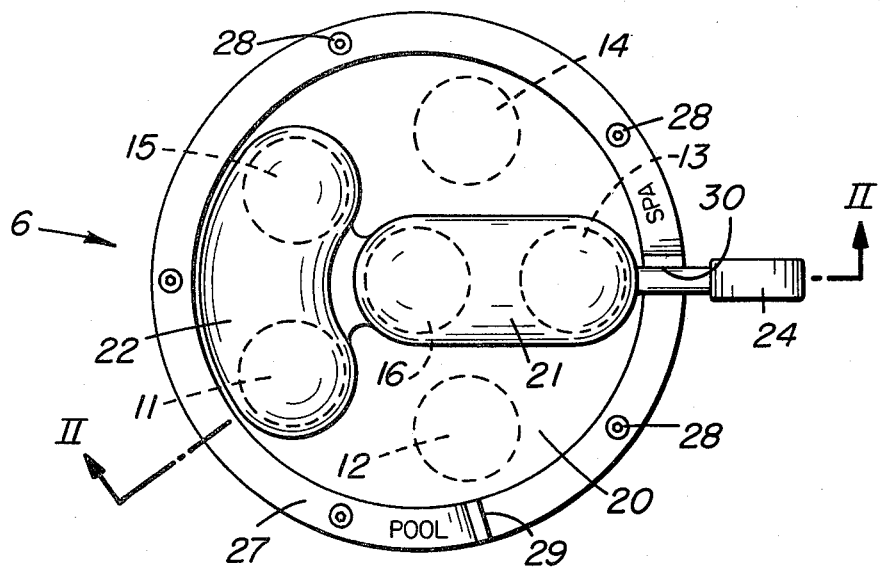
FIG_1
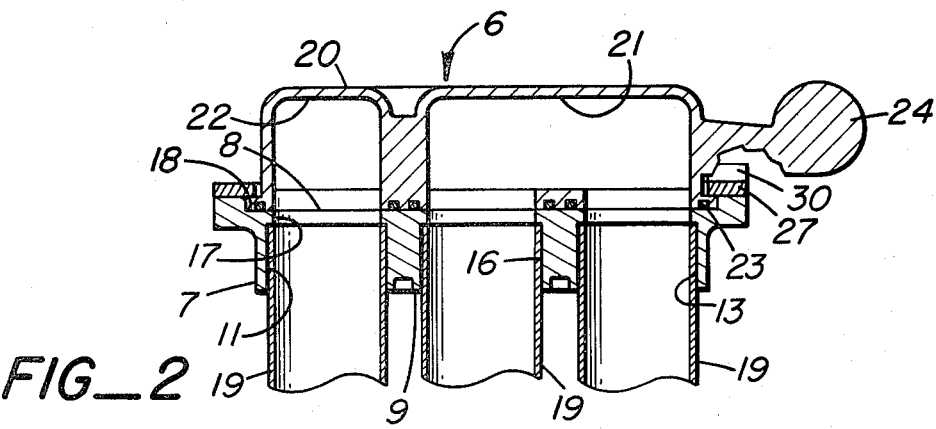
FIG_2
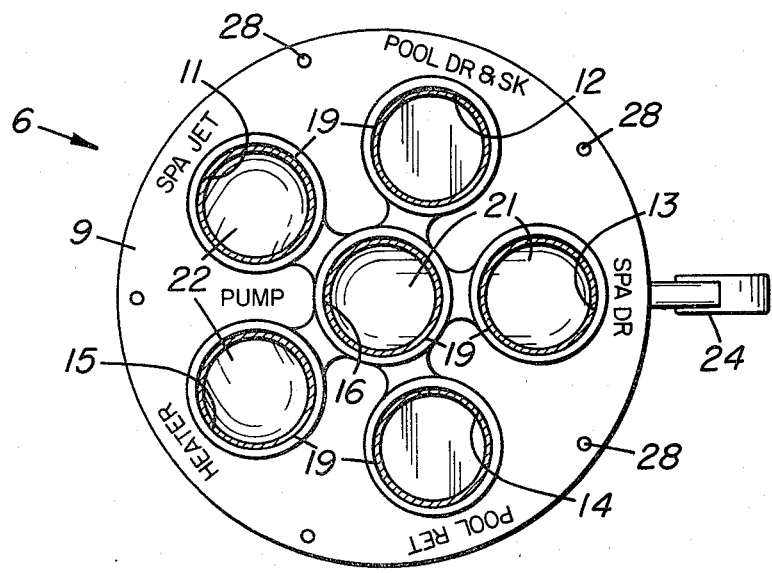
FIG_3

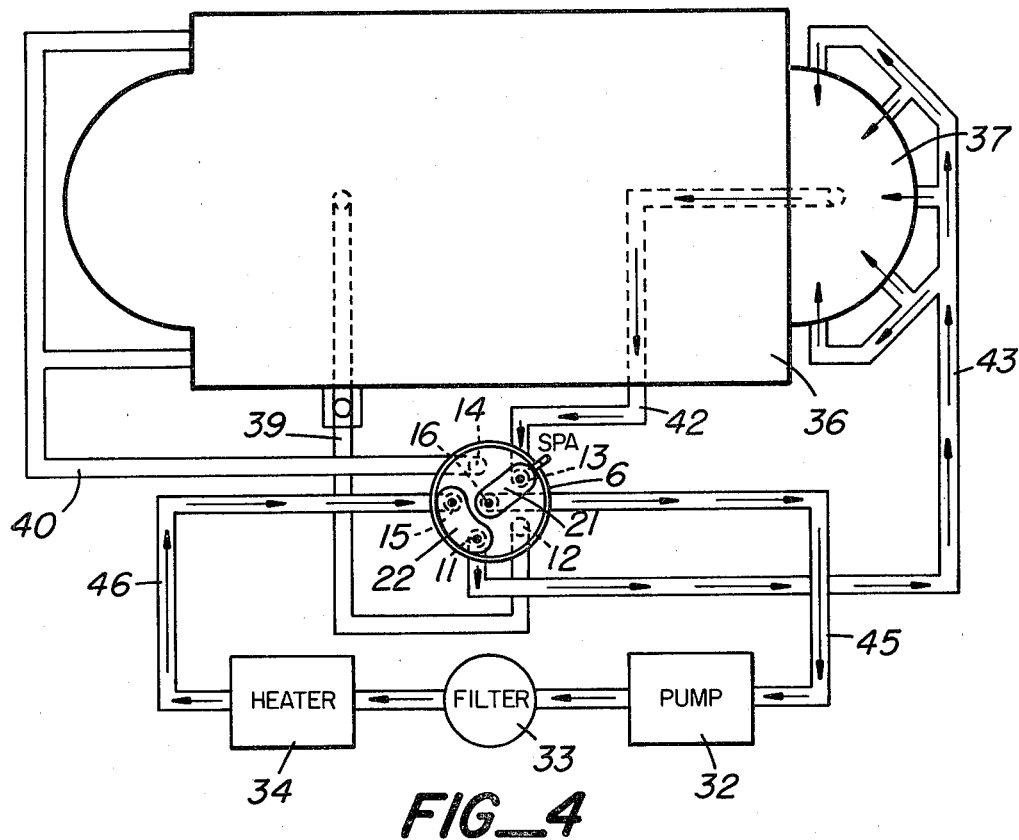
FIG_4
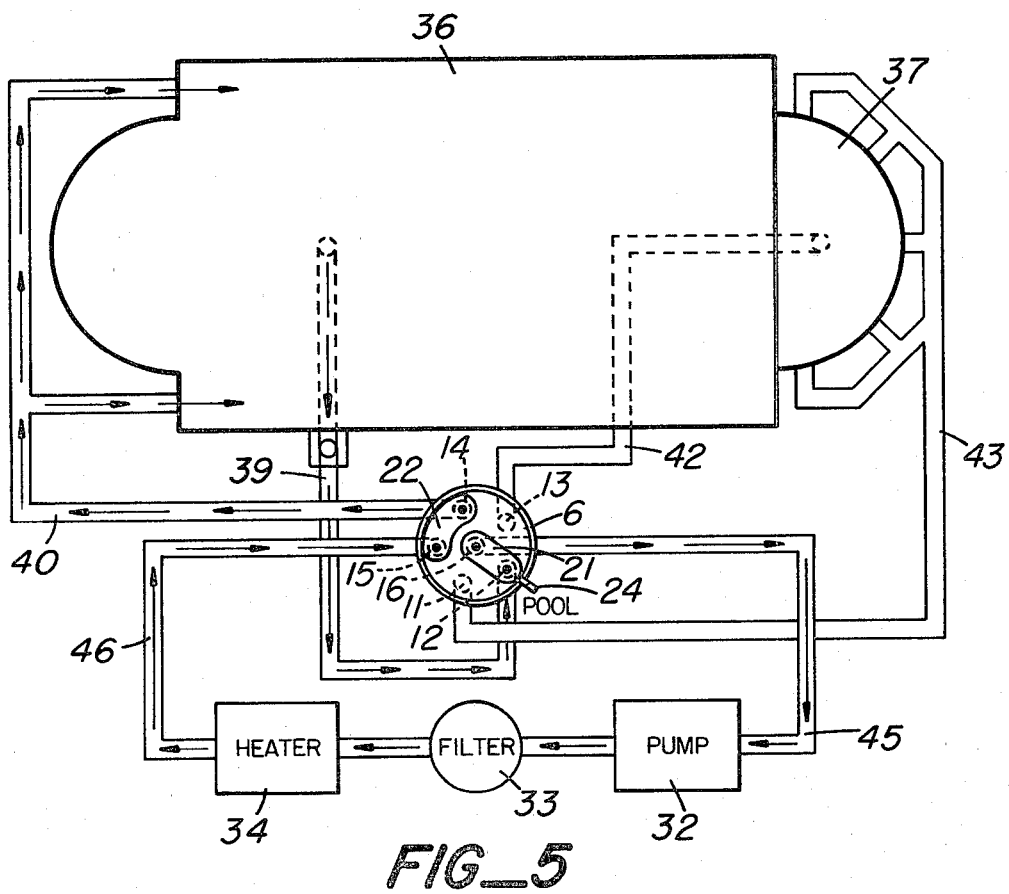
FIG_5

SWIMMING POOL/SPA SELECTOR VALVE

DESCRIPTION

1. Technical Field

This invention relates generally to valves and more particularly to valves for changing two independent fluid flows concurrently. In one application the valve of the present invention shifts the suction and return conduits of a recirculating pump between two sumps.

2. Background Art

The water in a typical swimming pool is heated and filtered by pumping a portion of the water through a filter and heater. A recirculating pump is connected to a drain line from the swimming pool and pumps the water in turn through a water filter and a water heater. The outlet from the water heater is connected to an input line leading back to the swimming pool.

Recently, small pools with high velocity water jets, called spas have been installed adjacent to swimming pools. Since spas also require heated and filtered water, these installations have typically provided plumbing cross-connections so that the same pump, filter and heater can be used for both the swimming pool and the spa.

At first, such cross-connections included a complicated piping manifold with four gate valves, two of which must be opened and two that must be closed whenever the pump, filter and heater are switched. These manifolds are complex to fabricate and have a cluttered appearance. There is also a continuing problem with operating the manifold because if the four gate valves are not properly positioned the pump and heater will be damaged.

Recently combination valves have been developed to eliminate the four gate valves and the manifold. These combination valves, however, often leak internally so that overnight all of the water in a raised spa syphons into the swimming pool leaving the spa empty. In addition, these combination valves require complicated and cluttered piping arrangements.

The present invention is directed to overcoming one or more of the problems set forth above.

DISCLOSURE OF THE INVENTION

In one aspect of the present invention a valve for concurrently shifting two independent flows of fluid is contemplated. The valve comprises a valve body having an end wall on which are located two constant flow ports A and B and four determinable flow ports C,D,E and F and two positionable conduits movable relative to the valve body between a first position and a second position. In the first position the first conduit connects port A with port C and the second conduit connects port B with port E. In the second position the first conduit connects port A with port D and the second conduit connects port B with port F. The valve also includes means for concurrently moving the conduits relative to the valve body between the first and second positions.

The valve of the present invention solves the problem of constructing and operating a complicated manifold and eliminates the problem of damaging the pump, filter and heater. The valve disclosed herein switches the pump, filter and heater between either the spa or the swimming pool by a simple movement of a selector member.

The valve disclosed herein also solves the problem of a complicated piping arrangement and a cluttered appearance by having all of the piping connect to the valve on one common end wall.

Other aspects, objects and advantages of this invention can be obtained from a study of the drawings, the disclosure and the appended claims.

BRIEF DESCRIPTION OF THE DRAWINGS

FIG. 1 is a top plan view of a valve according to one embodiment of the present invention.

FIG. 2 is a side elevational view, in section taken along line II—II of the embodiment of FIG. 1.

FIG. 3 is a bottom plan view of the valve of FIG. 1.

FIG. 4 is a schematic diagram of the valve of FIG. 1 illustrating its connection to a swimming pool and spa and its operation in the spa position.

FIG. 5 is a schematic diagram of the valve of FIG. 1 illustrating its connection to a swimming pool and spa and its operation in the pool position.

BEST MODE FOR CARRYING OUT THE INVENTION

Referring to FIGS. 1-3, the valve 6 includes a valve body 7 that is generally cylindrically shaped with generally flat top and bottom end walls 8,9. Five ports 11-15 are located in the bottom end wall of the valve body and are spaced apart about a circle. In addition, there is a port 16 located in the center of the circle. These ports each have an inside diameter that is sized to receive the free end of a pipe or conduit 19. The ports also connect to conduits 17 so that there is a passage through the valve body associated with each port. Since the length of conduits 17 is small compared to the ports, the entire passage will hereinafter be referred to as a port. The top end wall 8 contains a circular recess 18 that permits mounting and rotation of the other components of the valve.

Referring to FIGS. 2 and 3, the ports 11-16 are aligned for connection to six parallel and adjacent fluid conduits 19. In the preferred embodiment the conduits 19 are vertical and are grouped together in a compact bundle. The valve 6 in effect caps the top of the bundle so that the valve is positioned at a convenient location for actuation and so that the entire assembly has a neat appearance.

The apparatus also includes a generally cylindrically shaped selector member 20 having an end wall that is received in the circular recess 18 of the valve body 7. This engagement is sealed by an O-ring seal 23. The selector member 20 is roatated relative to the valve body 7 by a handle 24. The selector member includes a radial conduit 21 which connects and permits fluid communication between the center port 16 and one of the ports 11-15 in the circle. Opposite and generally perpendicular to the radial conduit 21 is an arcuate conduit 22 that connects and permits fluid communication between two adjacent ports in the circle of ports. These two ports are generally directly opposite to the port on the circle that communicates with the annular conduit. There is no fluid communication between the radial and arcuate conduits and the ports not in communication with the conduits 21,22 are blocked by a selector member. In FIG. 1 these are ports 12 and 14.

The selector member 20 is secured to the valve body 7 by an annular sealing ring 27. The sealing ring is rigidly secured to the valve body 7 by a plurality of bolts 28 and permits relative rotation of the selector member with respect to the valve body. The sealing ring also includes two mechanical stops 29,30 that can engage the handle 24 so that the radial conduit 21 can only communicate with ports 12 and 13.

It should be appreciated from FIG. 1 that whether the selector member 20 is against stop 29 or stop 30 the radial conduit 21 always communicates with port 16 and the arcuate conduit 22 always communicates with port 15. Thus, ports 15 and 16 are constant flow ports. The other ports 11-14 are in communication with the associated conduits depending on the position of the selector member. These ports 11-14 are thus determinable flow ports.

The valve 6 can be constructed from any conventional material that is suitable for attachment to a water system such as plastic, bronze or steel.

Referring to FIGS. 4 and 5, one application of the valve 6 is for shifting a recirculating water pump 32, a filter 33, and a heater 34 of conventional construction between a swimming pool 36 and a spa 37. In the figures the spa is illustrated adjacent to the swimming pool, but this need not be the case. The swimming pool 36 is connected to the valve 6 by pool drain line 39 and a pool return line 40. The pool drain line 39 is connected to port 12 on the valve and the pool return line 40 is connected to port 14. The spa 37 is connected to the valve 6 by a spa drain line 42 and a spa return line 43. The spa drain line 42 is connected to port 13 and the spa return line 43 is connected to port 11. The recirculating pump 32 is connected to port 16 of the valve 6 by pump suction line 45. The heater 34 is connected to port 15 of the valve by a heater discharge line 46. These lines are all conduits for the water and are connected to the pool, spa, pump and heater in the conventional manner.

In operation, the valve 6 operates in either the spa position illustrated in FIG. 4 or the pool position, FIG. 5. Referring to FIGS. 1 and 4, in the spa position the handle 24 of the selector member 20 is positioned against stop 29. The radial conduit 21 is thereby positioned so that the spa drain line 42 communicates through port 13 and port 16 to the pump suction line 45. The water from the spa is drawn through the valve 6 by the pump 32 and is discharged through the filter 33 and the heater 34 into the heater discharge line 46. The heater discharge line communicates to the spa return line 43 through the arcuate conduit 22 and ports 11 and 15. It should be noted that in the spa position the pool drain line 39 and the pool return line 40, which communicate to ports 12 and 14, are blocked by the selector member 20.

In the pool position illustrated in FIG. 5 the handle 24 of the selector member 20 is positioned against stop 30. The swimming pool drain line 39 is thereby connected to the pump suction line 45 through ports 12 and 16 and the radial conduit 21. The water from the swimming pool passes through the pump 32, the filter 33 and the heater 34 and is discharged into the heater discharge line 46. The water in the heater discharge line flows into the pool return line 40 through ports 14 and 15 and the arcuate conduit 22. In the pool position the spa drain and return lines 42,43 are blocked by the selector member 20.

In view of the foregoing it can be seen that a valve 6 according to the present invention can be used to shift the suction and return conduits 45,46 of a swimming pool recirculating pump 32, filter 33 and heater 34 easily between a swimming pool 36 and a spa 37 without the necessity for a complicated manifold and a labyrinth of pipes.

Other aspects, objects and advantages of this invention can be obtained from a study of the drawings, the disclosure, and the appended claims.

I claim:
1. A valve for concurrently shifting two independent flows of fluid, comprising:
   (a) a generally cylindrical valve body having a flat end wall on which are located two constant flow ports A,B and four determinable flow ports C,D,E and F, said ports being aligned for connection to six parallel and adjacent fluid conduits;
   (b) first and second positionable conduits movable relative to the valve body between a first position and a second position, in said first position said first conduit connects constant flow port A with determinable flow port C and said second conduit connects constant flow port B with determinable flow port E and in said second position said first conduit connects constant flow port A with determinable flow port D and said second conduit connects constant flow port B with determinable port F; and
   (c) selector means, connecting the valve body and the conduits together, for concurrently moving the first and second conduits relative to the valve body between the first position and the second position.

2. A valve for concurrently shifting two independent flows, comprising:
   (a) a generally cylindrical valve body having a flat end wall on which are located five ports A,B,C,D and E sequentially disposed about a circle and one port F disposed at the center of the circle;
   (b) a selector member connected to and rotatable relative to the valve body between a first and a second position, said selector member being generally cylindrical with end walls and having a radial conduit and an arcuate conduit therein for effecting fluid communication between said ports, in the first position the radial conduit connects port F with port A and the arcuate conduit connects port D with port C and in the second position the radial conduit connects port F with port B and the arcuate conduit connects port D with port E; and
   (c) means, connected to the selector member, for moving the selector member relative to the valve body between the first and the second positions.

3. An apparatus as in claim 2 including a mechanical stop limiting motion of the selector member to only said two positions.

4. A valve for connecting a pump and a heater between one of either a swimming pool or a spa, comprising:
   (a) a generally cylindrical valve body having a flat end wall on which are located six ports A,B,C,D,E and F, port A being connectable to a swimming pool drain conduit, port B being connectable to a spa drain conduit, port C being connectable to a swimming pool inlet conduit, port D being connectable to a discharge conduit from a pump and heater, port E being connectable to a spa inlet conduit, and port F being connectable to an inlet conduit to the pump and heater, said ports A-F being aligned for connection to parallel and adjacent disposed conduits;
   (b) a selector member connected to and rotatable relative to the valve body between a spa position and a swimming pool position, said selector member being generally cylindrical with end walls and having a radial conduit and an arcuate conduit therein for effecting fluid communication between said ports, in the spa position the spa drain line is connected to the inlet line to the pump and heater and the discharge line from the pump and heater is connected to the spa inlet line and in the swimming pool position the swimming pool drain line is connected to the inlet line to the pump and heater and the discharge line from the pool and heater is connected to the swimming pool inlet line; and (c) means, connected to the selector member, for moving the selector member relative to the valve body between the spa position and the pool position.

5. The valve of claim 4 wherein the selector member in the pool position blocks all conduits communicating with the spa and in the spa position blocks all conduits communicating with the pool.

6. The valve of claim 4 wherein ports A,B,C,D and E are disposed about a circle and port F is disposed at the center of the circle.

* * * * *